United States Patent [19]
Dorzan

[11] 3,778,097
[45] Dec. 11, 1973

[54] METHOD AND DEVICE FOR RETRIEVING LITTER

[76] Inventor: Peter A. Dorzan, 1 Muir Pl., Vauxhall, N.J. 07088

[22] Filed: Apr. 3, 1972

[21] Appl. No.: 240,461

[52] U.S. Cl.................. 294/118, 15/104.8, 294/1 R
[51] Int. Cl. ............................................ A47f 13/06
[58] Field of Search.................... 294/1 R, 19 R, 55, 294/118, 16; 15/104.8, 257.1, 257.6; 119/1 R

[56] References Cited
UNITED STATES PATENTS
| | | | |
|---|---|---|---|
| 3,431,008 | 3/1969 | Narita | 294/55 |
| 3,659,891 | 5/1972 | Pettenon et al. | 294/19 R |
| 3,560,039 | 2/1971 | Gruber | 294/16 |

Primary Examiner—Evon C. Blunk
Assistant Examiner—Johnny D. Cherry
Attorney—Edward R. Weingram

[57] ABSTRACT

A device for retrieving litter has manually actuated positioning means connected to a litter receptacle holder and a pushing member adapted to be enclosed in an envelope releasably secured about the pushing member. Actuation of the positioning means causes coaction between a litter receptacle mounted in the litter receptacle holder and the enveloped pushing member, so that litter is forced into the litter receptacle and held in the litter receptacle by the pushing surface. While the litter is being held within the litter receptacle by the enveloped pushing member, the envelope is released from about the pushing member and reversed to envelop the opening of the litter receptacle. The litter receptacle can then be manually ejected into the envelope when the positioning means are actuated to move the pushing member away from the litter receptacle.

14 Claims, 11 Drawing Figures

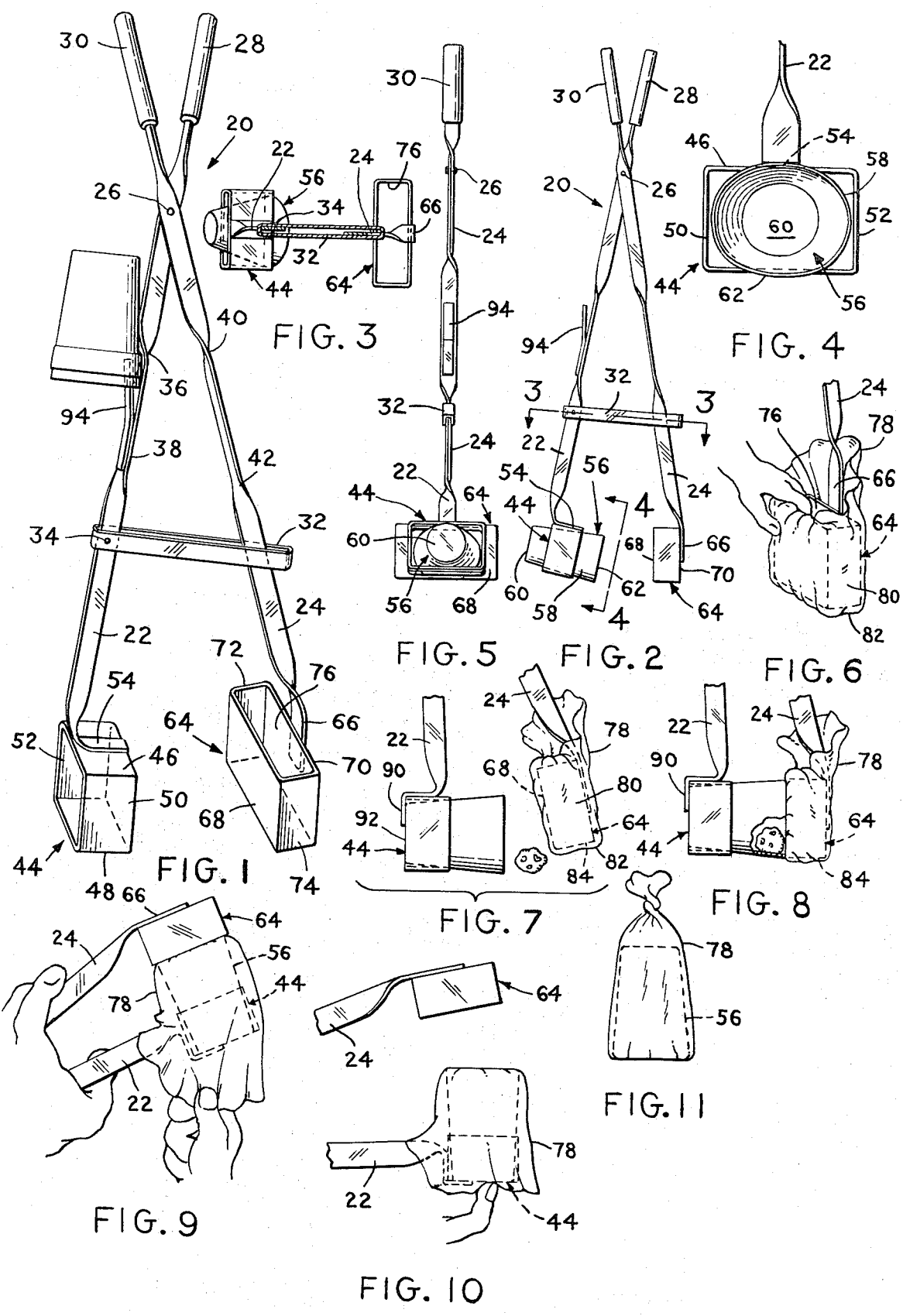

METHOD AND DEVICE FOR RETRIEVING LITTER

BACKGROUND OF THE INVENTION

1. Field of the Invention

This invention relates to devices for retrieving litter and, more particularly, to devices for retrieving animal litter.

2. Description of the Prior Art

The problem of quickly and cleanly removing litter and especially droppings from animals has long existed. This problem has come to prominence recently, as attention has been focused on the large number of domestic pets in urban centers and attempts have been made to pass laws requiring the owners of these pets to clean up after their pets when their pet leaves droppings on public property, such as streets or sidewalks.

Many attempts have been made in the past to provide a convenient method and apparatus to pick up litter, especially of a semi-solid nature, such as animal droppings left by pets. Most of these attempts have been unsuccessful because they required that the person attempting to remove the litter either stoop down and come into close proximity with the litter to be removed, such as when using a bag and a piece of linoleum to scrape the litter into the bag, or required the use of a long-handled device to remove the litter, which device actually came in contact with the litter and, thereby, become so dirty that it was necessary to wash the device before it could be hygienically stored until its next use. Additionally, the problem of disposing of the litter to be retrieved was never effectively overcome, since very often the litter could not be cleanly and completely placed within the litter receptacle without having some of the litter inadvertently deposited on the outside of the litter receptacle, so that the person attempting to dispose of the litter very often got the litter on his hands or clothing. Further, many earlier devices were not able to place the litter in a closed container, so that these devices could not be practically used unless there was a large depository for the litter very close to the spot where the litter had been dropped.

Another problem with earlier devices was that the user of the device had to employ both of his hands to operate the device, which made these devices totally impractical since a person walking a dog would usually have to use one hand to hold the dog on a leash and, therefore, could not effectively employ both his hands to operate the device.

SUMMARY OF THE INVENTION

To overcome the problems set forth, the present invention provides a device for retrieving litter and the like which has manually actuated positioning means connected to a litter receptacle holder and a pushing member adapted to be enclosed in an envelope releasably secured about the pushing member. Actuation of the positioning means causes coaction between a litter receptacle mounted in the litter receptacle holder and the enveloped pushing member, so that litter is forced into the litter receptacle and held in the litter receptacle by the pushing surface. While the litter is being held within the litter receptacle by the enveloped pushing member, the envelope is released from about the pushing member and reversed to envelop the opening of the litter receptacle. The litter receptacle can then be manually ejected into the envelope when the positioning means are actuated to move the pushing member away from the litter receptacle.

Accordingly, in view of the above, it is an object of the present invention to provide a device for retrieving litter which efficiently, quickly and cleanly removes litter, including semi-soft litter, such as animal droppings from streets, sidewalks, lawns, and the like.

Yet another object of the present invention is to provide a device for retrieving litter which can be used by a person to remove litter from the ground without the person having to stoop or bend.

Still another object of the present invention is to provide a device for retrieving litter which uses easily disposable receptacles for the litter.

Yet another object of the present invention is to provide a device for retrieving litter which places the litter into a closed, sanitary container, which can be disposed of at a later time.

It is a further object of the present invention to provide a device for retrieving litter which places the litter in a waterproof container to prevent any possibility of leakage or spillage on the operator of the device.

Still another object of the present invention is to provide a device for retrieving litter which can be operated with one hand to retrieve litter from the ground.

It is yet another object of the present invention to provide a device for retrieving litter and the like which does not come in contact with any of the litter it retrieves during operation of the device.

A further object of the present invention is to provide a device for retrieving litter and the like which does not require washing to remove litter from its surfaces after the device is used.

Still another object of the present invention is to provide a device for removing litter and the like which is simple and inexpensive to manufacture and durable in operation.

Other objects and advantages will be apparent from the following description of several embodiments of the invention and the novel features will be particularly pointed out.

BRIEF DESCRIPTION OF THE DRAWINGS

FIG. 1 is a perspective view of a litter retriever built in accordance with the teachings of the present invention.

FIG. 2 is a front view of the invention shown in FIG. 1.

FIG. 3 is a sectional view taken along lines 3—3 of FIG. 2.

FIG. 4 is a partial view of one arm of the device taken along lines 4—4 of FIG. 2.

FIG. 5 is a side view taken from the lefthand side of FIG. 2.

FIG. 6 is a perspective view illustrating insertion of a plastic bag into the device.

FIG. 7 shows another embodiment of the invention, in the open position, ready for scooping up litter.

FIG. 8 shows the device in the closed position with litter pushed into the container.

FIG. 9 shows a plastic bag being pulled over the litter receptacle.

FIG. 10 shows a receptacle covered with a plastic bag being pushed out of the device.

FIG. 11 shows the removed receptacle enclosed in a plastic bag, ready to be discarded.

DESCRIPTION OF THE PREFERRED EMBODIMENT

Referring to FIGS. 1 through 5 of the drawings, a device for retrieving litter, generally indicated at 20, is formed from two arms 22 and 24 respectively, which are substantially equal in length and which are connected at a point substantially closer to one of their ends by a pivotal connecting means, such as a rivet 26, to allow the arms to open and close in a scissor-like arrangement. The shorter section of the device is provided with gripping members 28 and 30 on arms 22 and 24 respectively to form handle means for opening and closing the longer portion of the arms. As shown in FIGS. 1, 2 and 3, a restraining member 32 is connected to one of the arms by a pin 34 or any other convenient fastening means and extends to enclose the other arm, so as to limit travel of the other arm to a predetermined limit.

Each of the arms includes upper and lower twists 36 and 38 respectively in arm 22 and 40 and 42 respectively in arm 24, as shown, to increase the rigidity of the arm, so that the device can be of fairly light weight and still have the required rigidity to perform adequately.

The end of arm 22 is connected to a means for holding a litter receptacle 44 which is in the form of a rectangular member having support surfaces in the form of a top 46 and a bottom 48, and sides 50 and 52. The end 54 of arm 22 is bent and twisted to lie on the top 46 of litter receptacle holder 44 and is rigidly connected to the litter receptacle holder by riveting, welding or any convenient method of attachment.

The means for mounting the litter receptacle is adapted to hold an apertured litter receptacle 56, such as a styrofoam cup or any other convenient receptacle having side walls 58, bottom 60 and mouth 62. The disposable litter receptacle is mounted in the means for mounting the litter receptacle, with the open end of the litter receptacle facing the pushing member 64.

A pushing member 64 is fastened to the end 66 of the other arm 24 and is also a four-sided rectangular object having a front wall or pushing surface 68 and a back wall 70 and lateral walls 72 and 74, and having an opening 76 at the top thereof which forms an envelope holding means into which portions of an envelope can be tucked (See FIG. 6). The pushing member is connected to the end 66 of the arm 24 at the rear wall 70 by means of spot welding, riveting or any other convenient method of connection.

An envelope or bag 78, having sides 80 and a closed bottom 82, such as a polyethylene bag or another type of suitable, waterproof bag, is releasably secured about the pushing member 64 by placing the pushing member into the bag 78 and then tucking the top of sides 80 of the bag into the opening 76 in the top portion of the pushing member, as shown in FIG. 6. The envelope bag then completely protects and envelops the pushing member to prevent any litter from coming in contact with the pushing member and particularly the pushing surface 68.

When a disposable cup or other litter receptacle 58 is placed in the litter receptacle holder 44, it is deformed by the rectangular walls or supporting surfaces of the litter receptacle holder so that the open end 62 of the litter receptacle is flattened into an elliptical shape, as shown in FIGS. 4 and 5. This occurs because the vertical dimension between surfaces 46 and 48 is less than the horizontal dimension between surfaces 50 and 52. This has an important function, as will be explained below.

It is also important to notice that, as shown in FIG. 2, the aperture 62 of the litter receptacle 56 is positioned away from the support surfaces 46, 48, 50 and 52 of the litter receptacle holder and, further, because of the tapered shape of the litter receptacle and the space between the aperture 62 of the receptacle and the holder 44, the bottom of the litter receptacle aperture extends slightly below the bottom 48 of the litter receptacle holder. Since the litter receptacle extends below the litter receptacle holder, during normal use, the bottom 48 or other parts of the litter receptacle holder 44 will not come in contact with the surface on which the litter is lying and, therefore, will not come in contact with any litter which remains after the litter receptacle has passed over that area.

To insure that the litter receptacle 56 is positioned with the aperture 62 spaced from receptacle holder 44, FIGS. 7 through 10 show another embodiment of the invention in which a tang 90 extends from the end of arm 22 into the open back end 92 of the litter receptacle holder to prevent the litter receptacle 58 from sliding within the litter receptacle holder 44 when the pushing member 64 is held against the aperture 62 of the receptacle.

The operation of the device is shown in FIGS. 7 through 10. Arms 22 and 24 act as means to position the pushing member 64 and the means 44 for holding the litter receptacle in operative relationship to allow relative movement of the pushing member litter receptacle holder 44 toward and away from each other. As shown in FIG. 7, the device is positioned with respect to the litter to be retrieved so that the litter receptacle and the pushing member in the envelope straddle the litter to be retrieved. This is accomplished by opening the hand grips 28 and 30 until the arm 24 is extended fully against restraining member 32. This operation can easily be accomplished by the operator with the use of only one hand by grasping one of the hand grips with the fingers and moving the other hand grip with the thumb or vice-versa.

After the litter receptacle is properly positioned, the handles 28 and 30 are drawn together, which, in turn, moves the litter receptacle and the envelope enclosed pushing member toward each other so that the front wall or pushing surface 68 of the pushing member will push the litter into the litter receptacle 58 (See FIG. 8). It should be noted at this point that the length from pivot 26 to the bottom 48 of receptacle holder 44 and the length to the bottom 84 of pushing surface 64 are substantially equal in length, so that the bottom of open end 62 of the disposable litter receptacle 58 which has been deformed to an oval shape as mentioned above, will very closely coincide with the exact bottom 84 of the pushing member 68. Therefore, the bottom of the open end of the disposable litter receptacle is positioned with respect to the bottom end 84 of the pushing surface member so that when the device is in use, there will be no space between the ground and either the bottom of aperture 62 of receptacle 56 or the pushing surface 68, which space would enable litter to escape being pushed into the disposable litter container.

By deforming the open mouth 62 of the cup, a greater surface area of the cup is kept in contact with the ground to even further increase the area which will be cleaned by a single operation of the litter retriever.

Further, the pushing surface 68 and the support surfaces are disposed so that the entire edge of the aperture 62 of a receptacle 56 is in contact with the envelope covered pushing surface, thereby preventing any spillage or seepage of the litter when the litter retrieving device is held in the closed position.

As shown in FIG. 8, after the litter retrieving device has been placed in the closed position, it can be temporarily held in that position until the operator is able to conveniently remove the disposable litter container from the device. For example, if the operator had a dog on a leash and the dog was pulling or in another way being difficult to handle, then the operator could temporarily carry the litter in the disposable container with the litter retriever in the closed position until he was able to get the dog under control.

The removal of the disposable litter container is done conveniently and cleanly, without the person using the device ever having to touch or come in contact with the litter, or even having to touch the disposable litter container. As shown in FIGS. 9 through 11, removal is accomplished by first lifting out the tucked in upper ends of the envelope 78 from the envelope holding member and then reversing the envelope so that it is drawn over and around the disposable litter receptacle, as shown in FIG. 9. Therefore, the areas of contact between the envelope and the litter receptacle which were used to sweep the litter into the disposable litter receptacle are now on the inside of the envelope and access is not easily obtained to them. As shown in FIG. 10, after the envelope is drawn around the disposable litter container, the litter container is pushed out of the litter holder, and the envelope is grasped on its outer, clean side to pull the litter receptacle out of the litter receptacle holder. The bag is then sealed, as shown in FIG. 11, to envelop the litter and the disposable litter receptacle in a sanitary, easily disposed of package, which is completely odor-free.

As shown in FIG. 1, one of the arms, in this case arm 22, has a small tang 94 extending upward from the arm to form a holder for spare cups and bags which can, therefore, be conveniently stored on the device.

There are several distinct advantages to the use of this device by owners of domestic pets, such as dog owners. Properly used, the device should never come in contact with any of the litter which it is used to retrieve, since only the disposable litter retriever and the envelope itself come in contact with the litter. Therefore, the device does not need washing or rinsing after every use and remains in a state of acceptable hygienic condition. Accordingly, it can be kept with the leash for the pet, so that it can be conveniently taken whenever the pet is taken out for a walk.

Additionally, the device can easily be used with one hand, so that the user does not have to fear that his pet will be uncontrolled or have to be tied up to some hitching post or other restraining means when he is using the litter retriever.

Further, the materials used in the operation of the device are readily available. It has been found that standard 9-ounce or 10-ounce styrofoam cups have worked exceedingly well, along with readily obtained polyethylene bags.

It will be understood that various changes in the details, materials and arrangements of parts which have herein been described and illustrated in order to explain the nature of the invention may be made by those skilled in the art, within the principles and scope of the invention as expressed in the appended claims.

What is claimed is:

1. A method of retrieving litter and the like comprising the steps of:
    enclosing a pushing surface in an envelope to prevent litter from contacting the pushing surface;
    inserting an apertured litter receptacle in means for holding a litter receptacle, with the aperture facing the pushing surface;
    moving apart the means for holding a litter receptacle and the pushing surface to position the litter receptacle and the envelope astride the litter to be retrieved;
    moving the pushing surface and the means for holding a litter receptacle toward each other until the envelope is in contact with and closes the aperture of the litter receptacle, so that the litter to be retrieved between the envelope and the litter receptacle will enter the aperture of the litter receptacle and be held therein by the envelope covered pushing surface;
    reversing the envelope to remove it from about the pushing surface and place it about the litter receptacle;
    ejecting the litter receptacle from the means for holding a litter receptacle into the envelope;
    closing the envelope about the litter receptacle to seal the litter receptacle and the litter therein within the envelope.

2. The method of retrieving litter and the like according to claim 1 further comprising, before the step of moving the pushing surface and the means for holding a litter receptacle toward each other, the step of securing the envelope in position about the pushing surface.

3. The method of retrieving litter and the like according to claim 2, wherein the step of ejecting the litter receptacle from the means for holding a litter receptacle includes the moving of the pushing surface and the means for holding a litter receptacle away from each other.

4. The method of retrieving litter and the like according to claim 3, wherein the steps of spacing apart the litter receptacle holder and pushing surface consists of pivoting the pushing surface and the means for holding a litter receptacle about a common pivot point.

5. The method of retrieving litter and the like according to claim 4 wherein the step of inserting the apertured litter receptacle in the means for holding a litter receptacle includes deforming the aperture of the litter receptacle to increase the area of the aperture adjacent the end of the pushing surface remote from the common pivot point.

6. Apparatus for retrieving litter and the like comprising:
    means to hold a litter receptacle;
    a pushing member having a pushing surface;
    means to position the pushing surface and the means to hold a litter receptacle in operative relation to allow the relative movement of the pushing surface and the means to hold a litter receptacle toward and away from each other, so the pushing surface can be brought to bear against a litter receptacle placed in the means to hold a litter receptacle;
    means to releasably secure an envelope about the pushing surface; and said means to hold a litter receptacle comprise:
a plurality of support surfaces adapted to receive an apertured litter receptacle and hold the litter receptacle with the aperture of the receptacle in operative position to contact the pushing surface; and
said means to hold a litter receptacle constructed and arranged so that a litter receptacle held in said holder will be removed by movement of the receptacle toward said pushing surface.

7. The apparatus for retrieving litter and the like according to claim 6 wherein the positioning means comprise:
a first arm connected at one end to the means to hold a litter receptacle;
a second arm operatively connected at one end thereof to the pushing surface;
means pivotally connecting the first and second arms at a point intermediate the ends thereof; and
the other end of the first and second arms forming handle means to position the pushing surface and the means for holding a litter receptacle with respect to each other.

8. The apparatus for retrieving litter and the like according to claim 7 wherein the pushing member includes the means to secure an envelope about the pushing surface.

9. The apparatus for retrieving litter and the like according to claim 8 wherein the means to releasably secure an envelope about the pushing surface comprise an aperture in the pushing member adapted to tuck in a portion of an envelope placed about the pushing member.

10. The apparatus for retrieving litter and the like according to claim 9 wherein:
the pushing member comprises
the pushing surface; and
at least one support member connected to the pushing surface; and
the second arm is connected at one end to one of the pushing surface and a support member of the pushing member.

11. The apparatus for retrieving litter and the like according to claim 7 wherein the means to hold the litter receptacle further comprise positioning means to properly position a litter receptacle within the means to hold the litter receptacle.

12. The apparatus for retrieving litter and the like according to claim 7 wherein the plurality of support surfaces adapted to receive an apertured litter receptacle are spaced vertically and horizontally with the horizontal spacing larger than the vertical spacing so that when any cup-shaped litter receptacle is held within the plurality of support surfaces, the aperture of the cup will be elongated in the horizontal direction and compressed in the vertical direction.

13. The apparatus for retrieving litter and the like according to claim 13 wherein the positioning means further comprise restraining means connected to one of the first and second arms and operatively associated with the other of the first and second arms to prevent excessive relative movement between the first and second arms.

14. The apparatus for retrieving litter and the like according to claim 13 wherein one of the first and second arms includes means for holding additional litter receptacles.

* * * * *